(12) United States Patent
Chai et al.

(10) Patent No.: US 9,985,990 B2
(45) Date of Patent: *May 29, 2018

(54) SECURITY INFORMATION INTERACTION SYSTEM, DEVICE AND METHOD BASED ON ACTIVE COMMAND OF SECURE CARRIER

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Yu Zhou, Shanghai (CN); Wei Guo, Shanghai (CN); Dingzhou Li, Shanghai (CN)

(73) Assignee: China UnionPay Co., Ltd. (CN)

( * ) Notice: Subject to any disclaimer, the term of this patent is extended or adjusted under 35 U.S.C. 154(b) by 72 days.

This patent is subject to a terminal disclaimer.

(21) Appl. No.: 14/780,669

(22) PCT Filed: Apr. 1, 2014

(86) PCT No.: PCT/CN2014/074512
§ 371 (c)(1),
(2) Date: Sep. 28, 2015

(87) PCT Pub. No.: WO2014/161467
PCT Pub. Date: Oct. 9, 2014

(65) Prior Publication Data
US 2016/0050232 A1    Feb. 18, 2016

(30) Foreign Application Priority Data
Apr. 2, 2013   (CN) .......................... 2013 1 0112074

(51) Int. Cl.
*H04L 29/06*         (2006.01)

(52) U.S. Cl.
CPC .............. *H04L 63/18* (2013.01); *H04L 63/00* (2013.01); *H04L 63/04* (2013.01)

(58) Field of Classification Search
None
See application file for complete search history.

(56) References Cited

U.S. PATENT DOCUMENTS 6,676,022 B1    1/2004    Guthery et al.
8,041,338 B2 *  10/2011   Chen .................... G06Q 20/108
                                                                455/407

(Continued)

FOREIGN PATENT DOCUMENTS

| CN | 101031939 A | 9/2007 |
| CN | 101894235 A | 11/2010 |

(Continued)

OTHER PUBLICATIONS

Office Action corresponding to Taiwanese Application No. 103112135 dated Oct. 29, 2015.

(Continued)

*Primary Examiner* — Farid Homayounmehr
*Assistant Examiner* — Olanrewaju J. Bucknor
(74) *Attorney, Agent, or Firm* — Myers Bigel, P.A.

(57) ABSTRACT

The invention proposes a security information interaction system, apparatus and method based on security carrier's active command. The method comprises: an information interaction terminal, based on a user's command, establishes a security dialog channel between the information interaction terminal and a security carrier so as to perform a security information interaction process, wherein the user's command indicates a target application associated with the security information interaction process; and the security carrier activates the target application during the establishment of the security dialog channel and then executes the (Continued)

security information interaction process based on the security dialog channel. In the security information interaction system, apparatus and method based on security carrier active command disclosed in the invention, the security carrier can initiate an active command to the information interaction terminal.

8 Claims, 2 Drawing Sheets

(56) References Cited

U.S. PATENT DOCUMENTS

| | | | |
|---|---|---|---|
| 2006/0074698 A1* | 4/2006 | Bishop | G06Q 20/3278 705/50 |
| 2006/0126422 A1* | 6/2006 | Takagi | G06F 12/1433 365/232 |
| 2006/0206941 A1* | 9/2006 | Collins | H04L 63/1425 726/25 |
| 2007/0207798 A1 | 9/2007 | Talozi et al. | |
| 2008/0045192 A1* | 2/2008 | Zhao | H04L 63/104 455/414.2 |
| 2009/0011745 A1 | 1/2009 | Cha | |
| 2011/0003580 A1* | 1/2011 | Belrose | G06F 21/34 455/410 |
| 2011/0131640 A1* | 6/2011 | Canis Robles | G06F 21/606 726/7 |
| 2012/0021683 A1 | 1/2012 | Ma et al. | |
| 2012/0110292 A1* | 5/2012 | Martini | G06F 21/79 711/163 |
| 2012/0159148 A1* | 6/2012 | Behren | G06Q 20/3552 713/150 |
| 2012/0190354 A1* | 7/2012 | Merrien | H04W 4/001 455/422.1 |
| 2012/0238244 A1 | 9/2012 | Ennesser et al. | |
| 2012/0317628 A1* | 12/2012 | Yeager | G06Q 20/204 726/5 |
| 2013/0054474 A1* | 2/2013 | Yeager | G06Q 20/3223 705/71 |
| 2013/0060959 A1* | 3/2013 | Taveau | H04W 12/08 709/232 |
| 2013/0073859 A1* | 3/2013 | Carlson | H04L 9/3247 713/176 |
| 2013/0205414 A1* | 8/2013 | Jussila | H04L 63/04 726/30 |
| 2014/0019746 A1* | 1/2014 | Hans | G06F 21/606 713/150 |
| 2014/0074716 A1* | 3/2014 | Ni | G06F 21/51 705/44 |
| 2014/0342719 A1* | 11/2014 | Lindholm | G06F 21/77 455/418 |

FOREIGN PATENT DOCUMENTS

| | | |
|---|---|---|
| CN | 101916388 A | 12/2010 |
| CN | 101930552 A | 12/2010 |
| TW | 200805057 A | 1/2008 |

OTHER PUBLICATIONS

Chinese First Office Action Corresponding to Application No. 201310112074.X; dated Nov. 2, 2016; Foreign Text Only, 7 Pages.
European Search Report Corresponding to Application No. 14 77 9842; dated Oct. 19, 2016; 7 Pages.
ETSI TS 102 484 V11.0.0 (Sep. 2012), Smart Cards; Secure channel between a UICC and an end-point terminal (Release 11), Technical Specification, Sep. 2012, 30 pages.
ETSI TS 102 223 V11.1.0 (Dec. 2012), Smart Cards; Card Application Toolkit (CAT), (Release 11), Technical Specification, Dec. 2012, 228 pages.
International Search Report corresponding to International Application No. PCT/CN2014/074512 dated Jul. 4, 2014.

* cited by examiner

SECURITY INFORMATION INTERACTION SYSTEM, DEVICE AND METHOD BASED ON ACTIVE COMMAND OF SECURE CARRIER

RELATED APPLICATIONS

This application is a 35 U.S.C. § 371 national phase application of PCT Application PCT/CN2014/074512 filed Apr. 1, 2014 which claims priority to Chinese Application No. 201310112074.X filed Apr. 2, 2013. The entire content of each is incorporated herein by reference in its entirety.

FIELD OF THE INVENTION

The present invention relates to a security information interaction system, apparatus and method, and more particularly, to a security information interaction system, apparatus and method based on security carrier's active command.

BACKGROUND

Currently, with the increasing development of computers and network applications and the increasing abundance of business types in different fields, the security information interaction (i.e., the information interaction having a high demand on safety, for example, the transaction processing procedure in financial fields) system and method (in particular, a security information interaction system and method that is based on a mobile device) is becoming more and more important.

In the existing technical solutions, typically, an information interaction terminal (e.g., a mobile terminal) initiates an active command request to a security carrier (i.e., an independent hardware module having a computing and storing function, into which many functions are designed for protecting the safety of the stored data and providing a corresponding safety mechanism service for use by external devices, for example, a security SD card or financial IC card having an independent computing chip), and then the security carrier fulfills an associated processing task based on the received command.

However, the existing technical solutions have the following problem: since a security carrier does not have an ability of initiating an active command to the information interaction terminal, the range of application as well as the ability and ways of data processing are limited, thus making it not widely applicable to various types of business.

Therefore, there is a need for a security information interaction system, apparatus and method in which a security carrier can initiate an active command to information interaction terminal.

SUMMARY OF THE INVENTION

In order to address the existing problem in the above prior art technical solutions, the invention proposes a security information interaction system, apparatus and method in which a security carrier can initiate an active command to information interaction terminal.

The object of the invention is achieved by the following technical solution.

A security information interaction system based on security carrier's active command, comprising:

an information interaction terminal which, based on a user's command, establishes a security dialogue channel between the information interaction terminal and the security carrier so as to perform a security information interaction process, wherein the user's command indicates a target application associated with the security information interaction process; and a security carrier which activates the target application during the establishment of the security dialogue channel and then executes the security information interaction process based on the security dialogue channel.

Preferably, in the above disclosed technical solution, during the procedure of executing the security information interaction process, the security carrier can send a security carrier active command to the information interaction terminal so as to use the particular functions of the information interaction terminal.

Preferably, in the above disclosed technical solution, the security dialogue channel is established in the following manner: (1) the information interaction terminal sends a terminal configuration instruction to the security carrier, wherein the terminal configuration instruction indicates the ability possessed by the information interaction terminal; (2) the security carrier analyzes and processes the received terminal configuration instruction and then sends a configuration success response back to the information interaction terminal; (3) the information interaction terminal sends a package command to the security carrier after receiving the configuration success response, wherein the package command indicates a target application and other operations required to be executed that are associated with the security information interaction process; (4) the safety carrier analyzes and processes the received package command so as to activate the target application, and then sends an operation success response back to the information interaction terminal; (5) the information interaction terminal sends an acquisition command to the security carrier after receiving the operation success response so as to indicate that the security dialogue channel is successfully established and is ready for receiving the security carrier active command from the security carrier.

Preferably, in the above disclosed technical solution, the information interaction terminal further comprises:

a user interface which is used for receiving the user's command;

a communication module which is used for executing the data communication between the information interaction terminal and the security carrier; and a command analyzing and processing module for analyzing and processing the security carrier active command from the security carrier so as to use the particular functions of the information interaction terminal.

Preferably, in the above disclosed technical solution, during the procedure of executing the security information interaction process, the security carrier can send one or more security carrier active commands to the information interaction terminal so as to use the particular functions of the information interaction terminal, and after the procedure of executing the security information interaction process is completed, the security carrier can send a completion flag to the information interaction terminal so as to terminate the security dialogue channel.

Preferably, in the above disclosed technical solution, after each time the information interaction terminal analyzes and processes the security carrier active command from the security carrier, the information interaction terminal sends a successful answer response back to the security carrier.

Preferably, in the above disclosed technical solution, the security carrier active command comprises a security carrier identifier field, a length field, a function identifying field and a data field in sequence, wherein the value of the security carrier identifier field indicates the identifier of the security carrier, the value of the function identifying field indicates the particular functions of the information interaction terminal which will be used by the security carrier active command, the data field contains data and/or parameters required for using the particular functions of the information interaction terminal, and the value of the length field indicates the overall length of both the function identifying field and the data field.

The object of the invention can be also achieved by the following technical solution:

an information interaction terminal which can, based on a user's command, establish a security dialogue channel between the information interaction terminal and a security carrier so as to perform a security information interaction process, wherein the user's command indicates a target application associated with the security information interaction process.

The object of the invention can be also achieved by the following technical solution:

a security carrier which can establishes a security dialogue channel between the security carrier and an information interaction terminal based on the a request from the information interaction terminal, and activates a target application when the security dialogue channel is established, and then executes a security information interaction process based on the security dialogue channel.

The object of the invention can be also achieved by the following technical solution:

a security information interaction method based on security carrier's active command, comprising the following steps:

(A1) an information interaction terminal, based on a user's command, establishes a security dialogue channel between the information interaction terminal and a security carrier so as to perform a security information interaction process, wherein the user's command indicates a target application associated with the security information interaction process; and (A2) the security carrier activates the target application during the establishment of the security dialogue channel and then executes the security information interaction process based on the security dialogue channel.

The security information interaction system, apparatus and method based on security carrier's active command disclosed in the invention have the following advantage: since the security carrier can initiate an active command to the information interaction terminal, it has a wider range of application and a stronger ability of being practiced, thus making it widely applied to various types of business.

BRIEF DESCRIPTION OF THE DRAWINGS

With reference to the drawings, the technical features and advantages of the invention will be better understood by those skilled in the art, wherein.

DETAILED DESCRIPTION OF THE INVENTION

Figure 1:
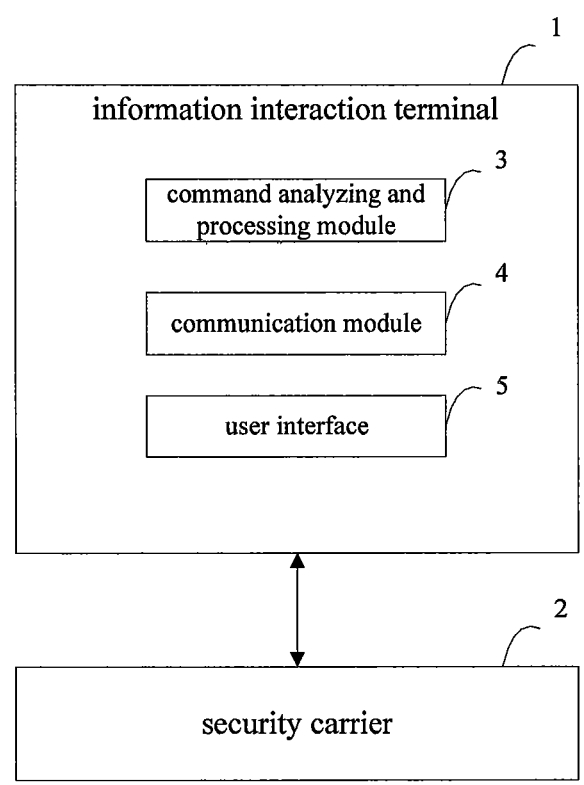
FIG. 1 is a schematic diagram showing the structure of the security information interaction system based on security carrier's active command according to an embodiment of the invention.

FIG. 1 is a schematic diagram showing the structure of the security information interaction system based on security carrier active command according to an embodiment of the invention. As shown in FIG. 1, the security information interaction system based on security carrier's active command disclosed in the invention comprises an information interaction terminal 1 (by way of example, such as cell phone, set-top box, POS machine, etc.) and a security carrier 2 (a contact card or a non-contact card, such as SIM card, SD card, financial card, etc.), wherein the information interaction terminal 1 establishes a security dialogue channel between the information interaction terminal 1 and the security carrier 2 based on a user's command so as to perform a security information interaction process (e.g., a payment process in financial field), wherein the user's command indicates a target application associated with the security information interaction process (e.g., a payment application in financial field). The security carrier 2 activates the target application (which refers generally to any application, functional interface or service interface, e.g., a payment application, applications, interfaces or functions for retrieving keys, retrieving data input from a mobile device) during the establishment of the security dialogue channel and then executes the security information interaction process based on the security dialogue channel.

Preferably, in the security information interaction system based on security carrier's active command disclosed in the invention, during the procedure of executing the security information interaction process, the security carrier 2 can send a security carrier active command to the information interaction terminal 1 so as to use the particular functions of the information interaction terminal 1.

Preferably, in the security information interaction system based on security carrier's active command disclosed in the invention, the security dialogue channel is established in the following manner: (1) the information interaction terminal 1 sends a terminal configuration instruction to the security carrier 2, wherein the terminal configuration instruction indicates the ability possessed by the information interaction terminal 1; (2) the security carrier 2 analyzes and processes the received terminal configuration instruction (e.g., executing a personalized operation on associated data) and then sends a configuration success response (i.e., a configuration ready flag) back to the information interaction terminal 1; (3) the information interaction terminal 1 sends a package command to the security carrier 2 after receiving the configuration success response, wherein the package command indicates a target application and other operations required to be executed that are associated with the security information interaction process; (4) the security carrier 2 analyzes and processes the received package command so as to activate the target application, and then sends an operation success response (i.e., an operation ready flag) back to the information interaction terminal 1; (5) the information interaction terminal 1 sends an acquisition command to the security carrier 2 after receiving the operation success response so as to indicate that the security dialogue channel is successfully established and is ready for receiving the security carrier active command from the security carrier 2.

Preferably, in the security information interaction system based on security carrier's active command disclosed in the invention, the information interaction terminal 1 further comprises a command analyzing and processing module 3, a communication module 4 and a user interface 5, wherein the user interface 5 is used for receiving the user's command, the communication module 4 is used for executing the data communication between the information interaction terminal 1 and the security carrier 2, and the command analyzing and processing module 3 is used for analyzing and processing the security carrier active command from the security carrier 2 so as to use the particular functions (e.g., displaying particular text information) of the information interaction terminal 1.

By way of example, the communication module 4 supports one or more of the following communication protocols: ISO14443 protocol, ISO816 protocol and I2C protocol.

Preferably, in the security information interaction system based on security carrier's active command disclosed in the invention, during the procedure of executing the security information interaction process, the security carrier 2 can send one or more security carrier active commands to the information interaction terminal 1 so as to use the particular functions of the information interaction terminal 1, and after the procedure of executing the security information interaction process is completed, the security carrier 2 sends a completion flag to the information interaction terminal 1 so as to terminate the security dialogue channel.

Preferably, in the security information interaction system based on security carrier's active command disclosed in the invention, after each time the information interaction terminal 1 analyzes and processes the security carrier active command from the security carrier 2, the information interaction terminal 1 sends a successful answer response back to the security carrier 2.

Preferably, in the security information interaction system based on security carrier's active command disclosed in the invention, the security carrier active command comprises a security carrier identifier field, a length field, a function identifying field and a data field in sequence, wherein the value of the security carrier identifier field indicates the identifier of the security carrier 2, the value of the function identifying field indicates (one or more) particular function of the information interaction terminal 1 which will be used by the security carrier active command, the data field contains data and/or parameters required for using the (one or more) particular function of the information interaction terminal 1, and the value of the length field indicates the overall length of both the function identifying field and the data field.

As can be seen from the above, the security information interaction system based on security carrier's active command disclosed in the invention has the following advantage: since the security carrier can initiate an active command to the information interaction terminal, it has a wider range of application and a stronger ability of being practiced, thus making it widely applied to various types of business.

As shown in FIG. 1, the invention discloses an information interaction terminal 1 which can establish a security dialogue channel between the information interaction terminal 1 and the security carrier 2 based on a user's command so as to perform a security information interaction process (e.g., a payment process in financial field), wherein the user's command indicates a target application (which refers generally to any application, functional interface or service interface, e.g., a payment application, applications, interfaces or functions for retrieving keys, retrieving data input from a mobile device) associated with the security information interaction process.

Preferably, in the information interaction terminal 1 disclosed in the invention, the security dialogue channel is established in the following manner: (1) the information interaction terminal 1 sends a terminal configuration instruction to the security carrier 2, wherein the terminal configuration instruction indicates the ability possessed by the information interaction terminal 1; (2) the security carrier 2 analyzes and processes the received terminal configuration instruction (e.g., executing a personalized operation on associated data) and then sends a configuration success response (i.e., a configuration ready flag) back to the information interaction terminal 1; (3) the information interaction terminal 1 sends a package command to the security carrier 2 after receiving the configuration success response, wherein the package command indicates a target application and other operations required to be executed that are associated with the security information interaction process; (4) the security carrier 2 analyzes and processes the received package command so as to activate the target application, and then sends an operation success response (i.e., an operation ready flag) back to the information interaction terminal 1; (5) the information interaction terminal 1 sends an acquisition command to the security carrier 2 after receiving the operation success response so as to indicate that the security dialogue channel is successfully established and is ready for receiving the security carrier active command from the security carrier 2.

Preferably, in the information interaction terminal 1 disclosed in the invention, the information interaction terminal 1 further comprises a command analyzing and processing module 3, a communication module 4 and a user interface 5, wherein the user interface 5 is used for receiving the user's command, the communication module 4 is used for executing the data communication between the information interaction terminal 1 and the security carrier 2, and the command analyzing and processing module 3 is used for analyzing and processing the security carrier active command from the security carrier 2 so as to use the particular function (e.g., displaying particular text information) of the information interaction terminal 1.

By way of example, in the information interaction terminal 1 disclosed in the invention, the communication module 4 supports one or more of the following communication protocols: ISO14443 protocol, ISO7816 protocol and I2C protocol.

Preferably, after each time the information interaction terminal 1 analyzes and processes the security carrier active command from the security carrier 2, the information interaction terminal 1 sends a successful answer response back to the security carrier 2.

Preferably, in the information interaction terminal 1 disclosed in the invention, the security carrier active command comprises a security carrier identifier field, a length field, a function identifying field and a data field in sequence, wherein the value of the security carrier identifier field indicates an identifier of the security carrier 2, the value of the function identifying field indicates (one or more) particular function of the information interaction terminal 1 which will be used by the security carrier active command, the data field contains data and/or parameters required for using the (one or more) particular function of the information interaction terminal 1, and the value of the length field indicates the overall length of both the function identifying field and the data field.

As shown in FIG. 1, the invention discloses a security carrier 2 (a contact card or a non-contact card, such as SIM card, SD card, financial card, etc.) which establishes a security dialogue channel between the security carrier 2 and the information interaction terminal 1 based on a request from the information interaction terminal 1 and activates a target application (which refers generally to any application, functional interface or service interface, e.g., a payment application, applications, interfaces or functions for retrieving keys, retrieving data input from a mobile device) when the security dialogue channel is established and then executes the security information interaction process based on the security dialogue channel.

Preferably, during the procedure of executing the security information interaction process, the security carrier 2 disclosed in the invention can send a security carrier active command to the information interaction terminal 1 so as to use the particular function of the information interaction terminal 1.

Preferably, in the security carrier 2 disclosed in the invention, the security dialogue channel is established in the following manner: (1) the information interaction terminal 1 sends a terminal configuration instruction to the security carrier 2, wherein the terminal configuration instruction indicates the ability possessed by the information interaction terminal 1; (2) the security carrier 2 analyzes and processes the received terminal configuration instruction (e.g., executing a personalized operation on associated data) and then sends a configuration success response (i.e., a configuration ready flag) back to the information interaction terminal 1; (3) the information interaction terminal 1 sends a package command to the security carrier 2 after receiving the configuration success response, wherein the package command indicates a target application and other operations required to be executed that are associated with the security information interaction process; (4) the security carrier 2 analyzes and processes the received package command so as to activate the target application, and then sends an operation success response (i.e., an operation ready flag) back to the information interaction terminal 1; (5) the information interaction terminal 1 sends an acquisition command to the security carrier 2 after receiving the operation success response so as to indicate that the security dialogue channel is successfully established and is ready for receiving the security carrier active command from the security carrier 2.

By way of example, a data communication between the security carrier 2 and the information interaction terminal 1 supports one or more of the following communication protocols: ISO14443 protocol, ISO7816 protocol and I2C protocol.

Preferably, during the procedure of executing the security information interaction process, the security carrier 2 disclosed in the invention can send one or more security carrier active commands to the information interaction terminal 1 so as to use the particular function of the information interaction terminal 1, and after the procedure of executing the security information interaction process is completed, the security carrier 2 sends a completion flag to the information interaction terminal 1 so as to terminate the security dialogue channel.

Preferably, in the security carrier 2 disclosed in the invention, the security carrier active command comprises a security carrier identifier field, a length field, a function identifying field and a data field in sequence, wherein the value of the security carrier identifier field indicates an identifier of the security carrier 2, the value of the function identifying field indicates (one or more) particular function of the information interaction terminal 1 which will be used by the security carrier active command, the data field contains data and/or parameters required for using the (one or more) particular function of the information interaction terminal 1, and the value of the length field indicates the overall length of both the function identifying field and the data field.

Figure 2:
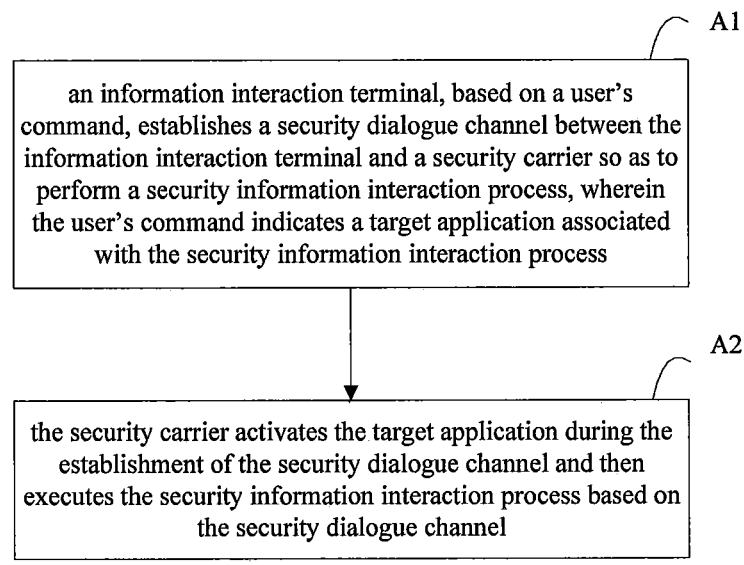
FIG. 2 is a flowchart of the security information interaction method based on security carrier's active command according to an embodiment of the invention.

FIG. 2 is a flowchart of the security information interaction method based on security carrier's active command according to an embodiment of the invention. As shown in FIG. 2, the security information interaction method based on security carrier's active command disclosed the invention comprises the following steps: (A1) an information interaction terminal, based on a user's command, establishes a security dialogue channel between the information interaction terminal and a security carrier so as to perform a security information interaction process (e.g., a payment process in financial field), wherein the user's command indicates a target application (e.g., a payment process in financial field) associated with the security information interaction process; and (A2) the security carrier activates the target application (which refers generally to any application, functional interface or service interface, e.g., a payment application, applications, interfaces or functions for retrieving keys, retrieving data input from a mobile device) during the establishment of the security dialogue channel and then executes the security information interaction process based on the security dialogue channel.

Preferably, in the security information interaction method based on security carrier's active command disclosed in the invention, during the procedure of executing the security information interaction process, the security carrier can send a security carrier active command to the information interaction terminal so as to use the particular function of the information interaction terminal.

Preferably, in the security information interaction method based on security carrier's active command disclosed in the invention, the security dialogue channel is established in the following manner: (1) the information interaction terminal sends a terminal configuration instruction to the security carrier, wherein the terminal configuration instruction indicates the ability possessed by the information interaction terminal; (2) the security carrier analyzes and processes the received terminal configuration instruction (e.g., executing a personalized operation on associated data) and then sends a configuration success response (i.e., a configuration ready flag) back to the information interaction terminal; (3) the information interaction terminal sends a package command to the security carrier after receiving the configuration success response, wherein the package command indicates a target application and other operations required to be executed that are associated with the security information interaction process; (4) the security carrier analyzes and processes the received package command so as to activate the target application, and then sends an operation success response (i.e., an operation ready flag) back to the information interaction terminal; (5) the information interaction terminal sends an acquisition command to the security carrier after receiving the operation success response so as to indicate that the security dialogue channel is successfully established and is ready for receiving the security carrier active command from the security carrier.

Preferably, in the security information interaction method based on security carrier's active command disclosed in the invention, during the procedure of executing the security information interaction process, the security carrier can send one or more security carrier active commands to the information interaction terminal so as to use the particular function of the information interaction terminal, and after the procedure of executing the security information interaction process is completed, the security carrier sends a completion flag to the information interaction terminal so as to terminate the security dialogue channel.

Preferably, in the security information interaction method based on security carrier's active command disclosed in the invention, after each time the information interaction terminal analyzes and processes the security carrier active command from the security carrier, the information interaction terminal sends a successful answer response back to the security carrier.

Preferably, in the security information interaction method based on security carrier's active command disclosed in the invention, the security carrier active command comprises a security carrier identifier field, a length field, a function identifying field and a data field in sequence, wherein the value of the security carrier identifier field indicates the identifier of the security carrier, the value of the function identifying field indicates (one or more) particular function of the information interaction terminal which will be used by the security carrier active command, the data field contains data and/or parameters required for using the (one or more) particular function of the information interaction terminal, and the value of the length field indicates the overall length of both the function identifying field and the data field.

As can be seen from the above, the security information interaction method based on security carrier's active command disclosed in the invention has the following advantage: since the security carrier can initiate an active command to the information interaction terminal, the invention has a wider range of application and a stronger ability of being practiced, thus making it widely applied to various types of business.

While the invention has been described by way of the above preferred embodiments, the way of implementing the invention is not limited to the above embodiments. It will be appreciated that those skilled in the art can make various changes and modifications on the invention without departing from the spirit and scope of the invention.

The invention claimed is:

1. A security information interaction system, comprising:
an information interaction terminal configured to, based on a user command, establish a security dialogue channel between the information interaction terminal and a security carrier, and further configured to participate in performance of a security information interaction process, wherein the user command indicates a target application associated with the security information interaction process; and
a security carrier configured to activate the target application when the security dialogue channel is established and further configured to, after establishment of the security dialogue channel, execute the security information interaction process based on the security dialogue channel, wherein during execution the security information interaction process, the security carrier is configured to send a security carrier active command to the information interaction terminal and use a particular function of the information interaction terminal;
wherein, to establish the security dialogue channel, the information interaction terminal is configured to perform operations comprising:
sending a terminal configuration instruction to the security carrier, wherein the terminal configuration instruction indicates capabilities possessed by the information interaction terminal;
receiving a configuration success response from the security carrier;
sending a package command to the security carrier responsive to receiving the configuration success response, wherein the package command indicates the target application;
receiving an operation success response from the security carrier indicating activation of the target application; and
sending an acquisition command to the security carrier responsive to receiving the operation success response indicating that the security dialogue channel has been established and that the security carrier active command can be transmitted.

2. The security information interaction system of claim 1, wherein the information interaction terminal further comprises:
a user interface configured to receive input indicating the user command;
a communication module configured to execute data communication between the information interaction terminal and the security carrier; and
a command analyzing and processing module configured to analyze and process the security carrier active command received from the security carrier so as to use the particular function of the information interaction terminal.

3. The security information interaction system of claim 2, wherein during execution of the security information interaction process, the security carrier is configured to send one or more security carrier active commands to the information interaction terminal and operatively use the particular function of the information interaction terminal, and wherein after execution of the security information interaction process is completed, the security carrier is configured to send a completion flag to the information interaction terminal, indicating that the security dialogue channel may be terminated.

4. The security information interaction system of claim 3, wherein multiple security carrier active commands are sent from the security carrier to the information interaction terminal, and wherein the information interaction terminal analyzes and processes each security carrier active command and sends a successful answer response back to the security carrier for each security carrier active command.

5. The security information interaction system of claim 4, wherein each security carrier active command comprises a security carrier identifier field, a length field, a function identifying field and a data field in sequence, wherein a value of the security carrier identifier field indicates the identifier of the security carrier, a value of the function identifying field indicates the particular function of the information interaction terminal which will be used by the security carrier active command, a value of the data field contains data and parameters required for using the particular function of the information interaction terminal, and a value of the length field indicates an overall length of both the function identifying field and the data field.

6. An information interaction terminal configured to, based on a user command, establish a security dialogue channel between the information interaction terminal and a security carrier, and participate in performance of a security information interaction process, wherein the user command indicates a target application associated with the security information interaction process;
wherein, to establish the security dialogue channel, the information interaction terminal is configured to perform operations comprising:

sending a terminal configuration instruction to the security carrier, wherein the terminal configuration instruction indicates capabilities possessed by the information interaction terminal;

receiving an operation success response from the security carrier indicating activation of the target application; and sending an acquisition command to the security carrier responsive to receiving the operation success response indicating that the security dialogue channel has been established and that the security carrier active command can be transmitted.

7. A security carrier configured to establish, based on a user command, a security dialogue channel between the security carrier and an information interaction terminal based on a request from the information interaction terminal, wherein the security carrier is further configured to activate a target application during establishment of the security dialogue channel, and execute a security information interaction process based on the security dialogue channel;

wherein, to establish the security dialogue channel, the security carrier is configured to perform operations comprising:

receiving a terminal configuration instruction from the information interaction terminal, wherein the terminal configuration instruction indicates capabilities possessed by the information interaction terminal:

sending a configuration success response;

receiving a package command from the information interaction terminal, wherein the package command indicates the target application associated with the security information interaction process;

sending an operation success response indicating activation of the target application; and receiving an acquisition command, from the information interaction terminal, indicating that the security dialogue channel has been established and that a security carrier active command can be transmitted.

8. A security information interaction method comprising:

establishing, by an information interaction terminal and based on a user command, a security dialogue channel between the information interaction terminal and a security carrier, wherein the information interaction terminal and the security carrier participate in performance of a security information interaction process, and wherein the user command indicates a target application associated with the security information interaction process; and activating, by the security carrier, the target application during the establishment of the security dialogue channel and then executing the security information interaction process based on the security dialogue channel, wherein during execution the security information interaction process, the security carrier sends a security carrier active command to the information interaction terminal and uses a particular function of the information interaction terminal; and wherein establishing the security dialogue channel includes operations comprising:

sending a terminal configuration instruction to the security carrier, wherein the terminal configuration instruction indicates capabilities possessed by the information interaction terminal:

receiving a configuration success response from the security carrier; sending a package command to the security carrier responsive to receiving the configuration success response, wherein the package command indicates the target application;

receiving an operation success response from the security carrier indicating activation of the target application; and sending an acquisition command to the security carrier responsive receiving the operation success response indicating that the security dialogue channel has been established and that the security carrier active command can be transmitted.

* * * * *

UNITED STATES PATENT AND TRADEMARK OFFICE
CERTIFICATE OF CORRECTION

PATENT NO. : 9,985,990 B2
APPLICATION NO. : 14/780669
DATED : May 29, 2018
INVENTOR(S) : Chai et al.

Page 1 of 1

It is certified that error appears in the above-identified patent and that said Letters Patent is hereby corrected as shown below:

On the Title Page

Item (30) Foreign Application Priority Data: Please correct "2013 1 0112074" to read -- 2013 1 0112074.X --

In the Specification

Column 5, Line 12: Please correct "ISO816" to read -- IS0816 --

Signed and Sealed this
Second Day of October, 2018

Andrei Iancu
*Director of the United States Patent and Trademark Office*